THERMOELECTRIC DEWPOINT DETERMINING SYSTEM

Original Filed June 9, 1961 2 Sheets-Sheet 1

INVENTOR.
TOM N. THIELE
BY Walter J. Kreske
ATTORNEY

July 20, 1965 T. N. THIELE 3,195,345

THERMOELECTRIC DEWPOINT DETERMINING SYSTEM

Original Filed June 9, 1961 2 Sheets-Sheet 2

INVENTOR.
TOM N. THIELE

BY Walter J. Kreske

ATTORNEY

United States Patent Office 3,195,345
Patented July 20, 1965

3,195,345

THERMOELECTRIC DEWPOINT DETERMINING SYSTEM

Tom N. Thiele, Oconomowoc, Wis., assignor to Cambridge Systems, Inc., Waltham, Mass., a corporation of Massachusetts Continuation of application Ser. No. 116,060, June 9, 1961. This application May 11, 1964, Ser. No. 368,446
16 Claims. (Cl. 73—17)

This invention relates to devices for measuring dewpoint, and more particularly to systems of the thermoelectric cooling type for determining the temperature at which a vapor begins to condense on a cold surface.

This is a continuation of application Ser. No. 116,060 filed June 9, 1961 by the same inventor and now abandoned.

Present dewpoint measuring devices depend generally upon the supply to a polished surface of a high rate of cooling from either an expendable chemical refrigerant such as Dry Ice, evaporating ether and the like, or from a mechanical refrigerating unit of the type utilizing a closed system compression and expansion cycle of a suitable refrigerant.

The expendable refrigerant is usually used where the bulk, weight, cost and power requirements of a closed system refrigerating unit cannot be tolerated and where the data sampling is of relatively brief duration. However, even the use of expendable refrigerants such as Dry Ice and ether present severe problems of bulkiness and cumbersome, inefficient operation.

These problems are overcome in the present invention of a thermoelectric dewpoint determining system which also incorporates other desirable features and advantages. Among these other desirable features and advantages are a thermoelectric dewpoint determining system which lends itself to extremely compact construction and efficient operation. Another advantage is that of a structure having relatively low power requirements for its operation. Further advantages are that it is inherently rugged and requires no mechanical moving parts nor escaping gasses as a cooling source and is relatively inexpensive to manufacture.

From the foregoing it should be apparent that a primary object of the present invention is the provision of a dewpoint determining system which is of extremely compact construction.

Further objects are the provision of a thermoelectric dewpoint determining system which is relatively light in weight, readily hand portable and suitable even for lifting to high altitudes by balloons such as used in weather studies.

Another object is the provision of a thermoelectric dewpoint determining system which has a relatively low power requirement for its operation.

And a still further object is the provision of a thermoelectric dewpoint determining system which requires no mechanical moving parts for its operation.

Further objects include the provision of a thermoelectric dewpoint determining system which is rugged, long lived, accurate and relatively inexpensive to manufacture.

These objects, features and advantages are achieved generally by providing a thermoelectric refrigerator of the type having a junction which is cooled by the passage of electric current therethrough, a mirror surface in heat conducting relation to the junction, and a current control circuit arranged for varying current intensity passing through the refrigerator in response to changes in reflectivity of the mirror surface.

By providing a light sensitive element and a light source positioned for reflection by the mirror of light rays from the light source onto the light sensitive element with the light sensitive element arranged for controlling current from the circuit to the refrigerator, an effective arrangement for controlling rate of cooling of the mirror surface as a function of mirror reflectivity is thereby achieved.

By providing a second mirror surface maintained at ambient temperature and a second light sensitive element positioned to receive reflected light rays from the second mirror surface, an effective arrangement for operation substantially independently of light source variations and with reliance on only comparison of reflectivity changes between the two mirrors caused by deposit of condensate on the cold mirror as a continuous control of the refrigerator current to effectively track dewpoint is thereby achieved.

By making the light sensitive elements in the form of photoresistive cells incorporated as two legs in a resistance bridge, a very sensitive and compact arrangement for controlling the electric circuit current output is thereby achieved as well as a desirable arrangement for canceling errors due to change of resistivity of the cells with temperature and light source variations.

By making the electric circuit in the form of a plurality of direct coupled power transistors, further compactness, low operating power requirements, lightness, reliability and elimination of mechanical working parts are achieved.

By providing a chamber enclosed by opposed walls with a light source and photoresistive cell on one wall, a light barrier therebetween and a pair of elongated thermoelectric elements extending through the opposite wall and electrically joined inside the chamber to form a cold thermoelectric junction with a mirror in heat conducting engagement with the cold junction and positioned to reflect light from the light source onto the photoresistive cell, the other ends of the pair of thermoelectric elements being in heat conducting engagement with a heat exchanger at substantially ambient temperature, a reliable and rugged structure for the formation of condensate on the mirror for tracking dewpoint is thereby achieved.

By providing a second photoresistive cell on the one wall and a second mirror in the chamber, positioned to reflect light from the source to the second cell, the second mirror being in heat conductive engagement with the heat exchanger, and arranging the two photoresistive cells as legs in the resistance bridge, a practical compact operating control structure is thereby achieved.

By making the electric circuit arrangement in the form of an amplifier controlled by the resistive bridge in manner to decrease power to the thermoelectric refrigerator with increase in reflected light intensity differential at the photoresistive cells, stable automatic operation in continuous tracking of the dewpoint is thereby achieved.

By making the thermoelectric refrigerator in the form of a bismuth telluride PN junction, an efficient thermoelectric cooling arrangement for wide variations in dewpoint conditions is thereby achieved.

These and other features, objects and advantages of the present invention will be better understood from the following description taken in connection with the accompanying drawings of a preferred embodiment of the invention and wherein.

Figure 1:
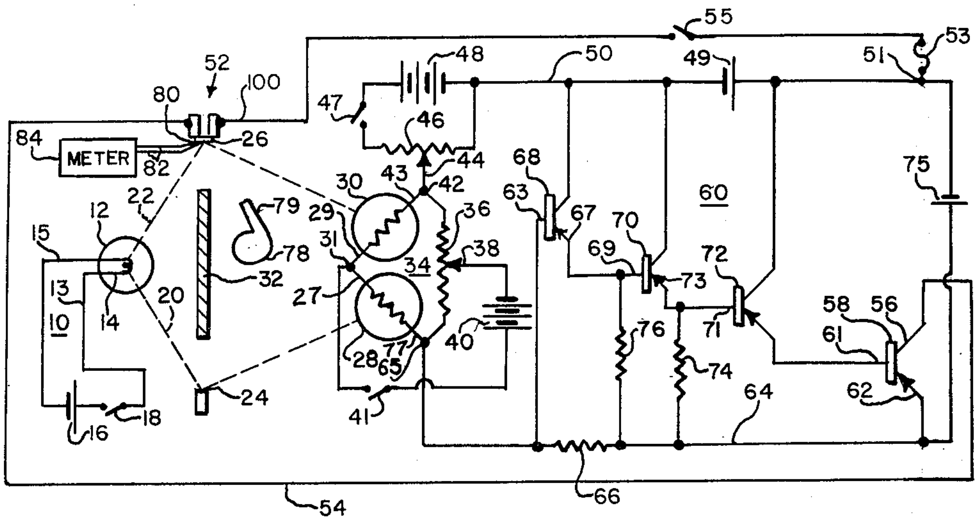
FIG. 1 is a partially block and partially schematic diagram of a dewpoint determining system constructed and operating in accordance with the present invention.

Referring to FIG. 1 in more detail, a preferred embodiment of the present thermoelectric dewpoint determining system has a light source 10 which includes an electric light bulb 12, preferably of the prefocused variety and having a filament 14 connected by lines 13 and 15 to a power source 16 such as a battery with a switch 18 for opening and closing the circuit to the filament 14.

When the switch 18 is closed, light rays 20 and 22 from the filament 14 are reflected by mirrors 24 and 26 respectively onto photoresistive cells 28 and 30 respectively which are hidden from direct rays of light from the light source 12 by a baffle or barrier 32. The leads 27 and 29 of the photoresistive cells 28 and 30 respectively are coupled together to a common terminal 31 to form two legs of a resistance bridge 34, the other two legs of which are formed by a potentiometer resistor 36 on either side of adjustable contact 38. The adjustable contact 38 is coupled to the negative terminal of a power source 40 such as a battery, the positive terminal of which is coupled through a switch 41 to the common terminal 31 of the photoresistive cells 28 and 30.

The other lead 43 of the photoresistive cell 30 is connected at terminal 42 through an adjustable contact 44 to a potentiometer resistor 46 which with a series switch 47 is connected across a power source 48 such as a battery. The negative terminal of the battery 48 is connected through an electric cable 50 to the collectors of transistors 68 and 70 in a high gain transistor amplifier 60 and to the negative terminal of a battery 49, the positive terminal of which is connected to the collector of a third transistor 72 in the transistor amplifier 60 and to a terminal 51. The terminal 51 is connected through a fuse 53, a switch 55 and an electric cable 100 to one leg 57 of a thermoelectric refrigerator 52 utilizing Peltier effect, and sometimes referred to as Peltier type cooler, for cooling the mirror 26 as shown and described in greater detail in connection with FIGS. 4 and 5. Another leg 59 of the thermoelectric refrigerator 52 is connected through an electric cable 54 to the collector 56 of a power output transistor 58 in the high gain transistor amplifier 60. The power output transistor 58 has a base 61 coupled to the emitter of the transistor 72 and has an emitter 62 coupled through an electric cable 64 and resistor 66 to a terminal 65 to which is connected by a lead 77 of the photoresistive cell 28 and one end of the potentiometer resistor 36 in the resistance bridge 34.

In the high gain transistor amplifier 60, the transistors 68, 70, 72 and 58 are direct coupled. The base 71 of transistor 72 is connected to the emitter 73 of the transistor 70 and through a resistor 74 to the electric cable 64, while the base 69 of the transistor 70 is connected to emitter 67 of the transistor 68 and through a resistor 76 to the electric cable 64 to enhance stability of operation of the amplifier 60. The first transistor stage 68 has a base 63 connected to the bridge terminal 65 side of the resistor 66. A direct current power source such as a low voltage, high ampere capacity battery 75 has its negative terminal connected to the terminal 51 and its positive terminal to the emitter 62 of the output transistor 58.

A blower 78 which may be of conventional design is arranged to direct by a nozzle or tube 79 a steady stream of air or other gas whose dewpoint is to be determined onto the cold mirror 26. Also, a thermocouple 80 on the face of the cold mirror 26 is connected by electric cables 82 to a suitable meter 84 such as a galvanometer calibrated to give the temperature at the thermocouple 80. Where the accuracy of a thermocouple is not necessary, a thermistor may be used in place of the thermocouple 80 and an ammeter in place of the galvanometer 84 for further economy and compactness of the system.

Figure 2:
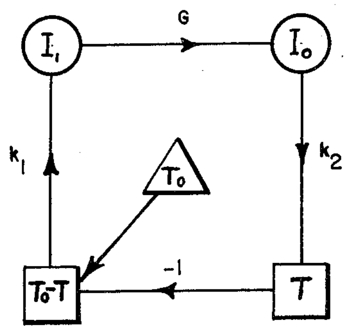
FIG. 2 is a block diagram illustrating a feedback loop applicable to the FIG. 1 embodiment for more clearly showing construction and operation thereof.

In the operation of the FIG. 1 embodiment, switches 18, 41, 47 and 55 are closed. The closing of switch 18 causes the filament 14 to illuminate the mirrors 24 and 26 so as to reflect light rays 20 and 22 onto the photoresistive cells 28 and 30 respectively. Adjustable contact 38 is set on the potentiometer resistor 36 to balance the resistive bridge 34 when there is no dew deposit on the cool mirror 26. When the bridge 34 is in this balanced condition, the adjustable contact 44 is set on the potentiometer resistor 46 to supply a full bias current for driving the amplifier 60 to maximum output, thereby feeding current to the thermoelectric cooler or refrigerator 52 for maximum cooling rate of the mirror 26. As the mirror 26 drops in temperature to the dewpoint, a condensation deposit forms thereon from the vapor in the gas or air stream emanating from the tube or nozzle 79 of the blower 78. The intensity of light rays 22 reflected from the cold mirror 26 onto the photoresistive cell 30 is thereby diminished and causes an unbalance in the resistance bridge 34 which, being in series with the bias current through the contact 44, reduces the input bias to the amplifier 60. This cause a corresponding reduction in the amplifier output current to the thermoelectric refrigerator 52 with a corresponding reduction in rate of cooling until equilibrium is reached. The accuracy with which this equilibrium condition is maintained and reflects the true dewpoint temperature may be calculated in the following manner:

Referring to the block diagram of the feedback loop in FIG. 2, the following can be written by inspection:

$$T=k_2I_0$$
$$I_0=GI_1$$
$$I_1=(T_0-T)k_1$$

From which it is found that:

$$I_1=T_0k_1/(1+Gk_2k_1)$$

and the error $T_0-T$ at balance becomes:

$$T_0-T=T_0/(1+Gk_2k_1)$$

where:

$T$=temperature of the cold mirror 26 in ° C. (degrees centigrade).
$T_0$=actual dewpoint temperature in ° C.
$k_1$=detection constant of the bridge 34 in amps./° C.
$k_2$=refrigerator constant in ° C./ampere.
$I_1$=input driving current to the amplifier 60.
$I_2$=output current of amplifier 60 to the thermo-electric refrigerator 52.
$G$=current gain of the amplifier 60.

The above analysis assumes that the thermoelectric refrigerator 52 has zero time constant and that operation is in the linear range where $\Delta T<<\Delta T_{max}$. Typical values of these constants are found to be $T_0=20°$ C., $k_1=10^{-5}$, $k_2=2$, and $G=5\times10^6$ and have been found to give an error of less than 0.2° C. at a dew point of 20° C. below ambient, the error being proportionately less for smaller temperature differences. These typical values are cited here for illustration only and are not intended as limitations since they may be changed by selection of components with other parameters to meet desired conditions of use of the present invention.

Since the control signal current $k_1(T_0-T)$ can decrease only when condensate is formed on the cold mirror 26, at all times when no condensate exists, there will be a constant maximum current flowing. The minimum gain required in amplifier 60 is that amount just sufficient to provide rated $I_0$ to the refrigerator with the maximum control signal current input to the amplifier 60. Since this leaves no safety margin in the event of loss of gain, a value several times this minimum should be used. By way of further example and not limitation, a typical value for maximum $I_1$ is $10^{-5}$ amperes, and for the comparable $I_0$ is 15 amperes. Thus, for these exemplary values of current, a minimum gain required in the amplifier 60 would be $1.6 \times 10^6$, in which case to insure a proper safety factor and better equilibrium accuracies an actual gain of $5 \times 10^6$ in amplifier 60 should be provided. Such gain and current characteristics may be achieved by using the following exemplary parameter values for components in the FIG. 1 embodiment:

| | |
|---|---|
| Photoresistors **28** and **30** | 50,000 ohms each. |
| Potentiometer **36** | 100,000 ohms. |
| Potentiometer **46** | 75,000 ohms. |
| Resistor **66** | 500,000 ohms. |
| Resistor **74** | 25,000 ohms. |
| Resistor **76** | 100,000 ohms. |
| Transistor **58** | Type 2N677 Bendix. |
| Transistors **68** and **70** | Type 2N112 Raytheon. |
| Transistor **72** | Type 2N1138 Bendix. |
| Batteries **16** and **49** | 1.5 volts. |
| Battery **40** | 67.5 volts. |
| Battery **48** | 4 volts. |
| Battery **75** | 2 volts. |
| Bulb **12** | Type 222 prefocused. |

In practice it has been found that throughout the operating range, changes in gain in the transistors introduce only very small error in indicated dewpoint since the circuit will then come to equilibrium with a slightly heavier layer of dew. The layer of dew at equilibrium is so thin, however, that a considerable margin exists before a significant error occurs in the temperature of the mirror 26.

Figure 5:
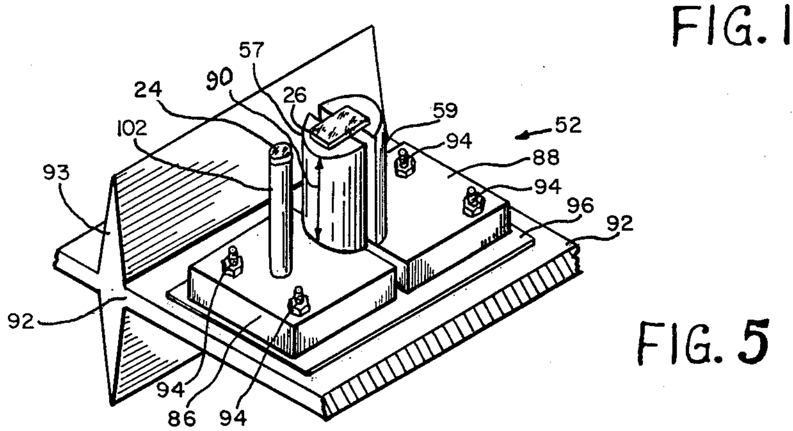
FIG. 5 is an isometric view of a portion of the embodiment shown in FIGS. 1, 3 and 4 to more clearly show construction.

Referring to FIG. 5 in more detail, the thermoelectric refrigerator 52 has preferably a pair of semi-conductor elements or legs 57 and 59 of a solid state material such as bismuth telluride. The leg 57 is of P type semi-conductor material (that is, having a predominance of acceptor type atoms or holes) and the leg 59 is of N type semi-conductor material (that is, having a predominance of donor type or carrier atoms). The legs 57 and 59 are each soldered at one of their respective ends to heat sink blocks 86 and 88 respectively of a highly heat conductive and low electrically resistive material as copper to form the hot junctions for the thermoelectric refrigerator 52.

For efficient operation of the thermoelectric refrigerator 52, it is necessary that very low contact resistance exist at the junctions between the legs 57 and 59 and the heat sink blocks 86 and 88 respectively. Such low contact resistance may be achieved by carefully following a procedure which includes sanding the surfaces to be joined, after which they are washed, followed by a light sandblasting and again washed, first with ethanol to remove any grease and then with distilled water. Thereafter, a light plating of nickel is applied, the plating continued until a matte finish is obtained. The surface is then tinned with a low melting point solder. The copper heat sink blocks 86 and 88 are also given a plating of nickel and similarly tinned. They are then heated to the solder melting point, the legs 57 and 59 positioned in place on the blocks 86 and 88 respectively, and the assembly cooled. This procedure is capable of producing junctions with electrical contact resistances of only 10 micro-ohms or less, which is very important for efficient operation of this type of cooler.

The mirror 26 which is preferably of metallic heat and electrically conductive material is also soldered in place in similar manner at the other ends of the legs 57 and 59 to form a cold junction to provide a pi-configuration thermoelectric refrigerator 52.

The legs 57 and 59 are of a length 90 such that they are about 3.5 times their individual cross sectional area of .5 square centimeter, a configuration which has been found to have the capability of effecting a greater than 20 degree centigrade temperature differential between the cold mirror 26 and the heat sinks 86 and 88 for a maximum rated $I_0$ current flow of 15 amperes. It should be understood that these are exemplary figures cited here to provide better understanding of the present invention and are not intended as a limitation thereof in view of their being variable by component parameters of the device.

The copper block heat sinks 86 and 88 are fastened, as by screws 94, pressurably against so as to be in heat conductive engagement with a conventional heat exchanger 92 of such highly heat conductive material as aluminum or copper and having cooling fins 93 for increased heat dissipation. A very thin membrane layer or sheet 96 of such electrically insulating material as mica is placed between the copper heat sinks 86 and 88 and the heat exchanger 92 to provide electrical insulation from the heat exchanger 92 with a minimum of heat conduction interference between the blocks 86 and 88 and the heat exchanger 92. Fastening of the blocks 86 and 88 to the heat exchanger 92 may be by screws 94 electrically insulated from the heat exchanger 92 by dielectric flanged collars 98 (FIG. 4).

A screw 94 on the heat sink 88 may be used as a terminal for the electric cable 100 for coupling to the negative terminal of the battery 75. A screw 94 on heat sink 86 may be used as a terminal for the electric cable 54 for coupling to the collector 56 of the output transistor 58 for operation of the thermoelectric refrigerator 52 in conjunction with the amplifier 60 as described above.

The mirror 24, which may be similar to the mirror 26, is fixed in heat conductive engagement to one end of a highly heat conductive rod 102, such as of aluminum or copper, the other end of which is fixed in heat conductive engagement with the heat sink 86 in any suitable manner such as by soldering or other mechanical fastening means. The mirror 24 is thereby maintained at substantially the temperature of the heat sink 86 which is close to ambient.

Figure 3:
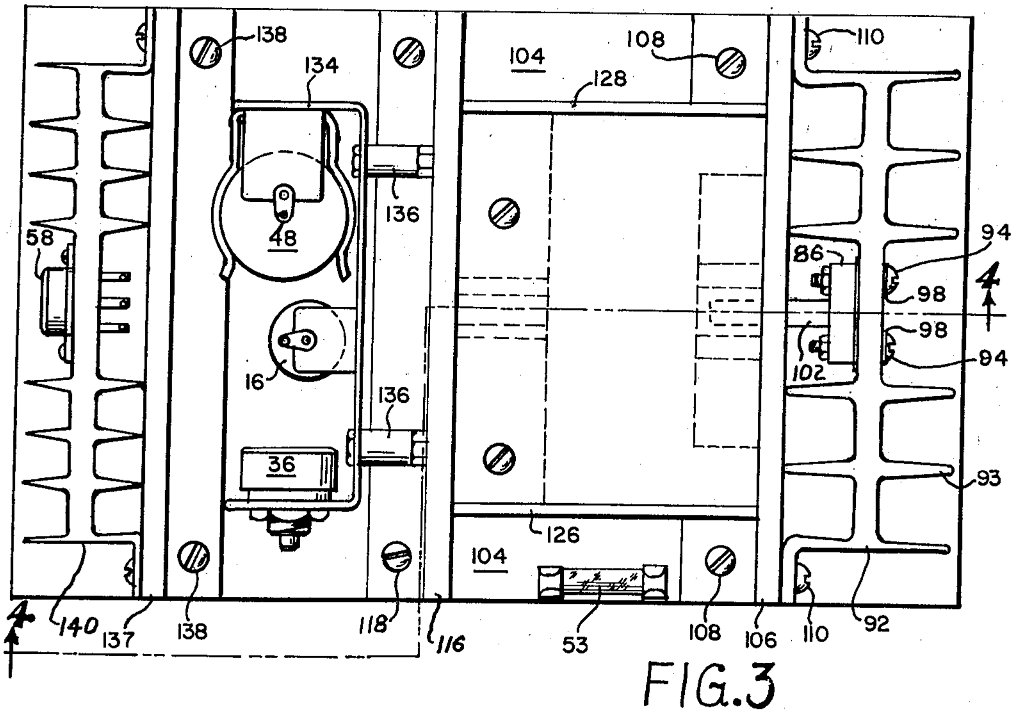
FIG. 3 is a plan view of a working embodiment of a portion of the embodiment shown schematically in FIG. 1.
Figure 4:
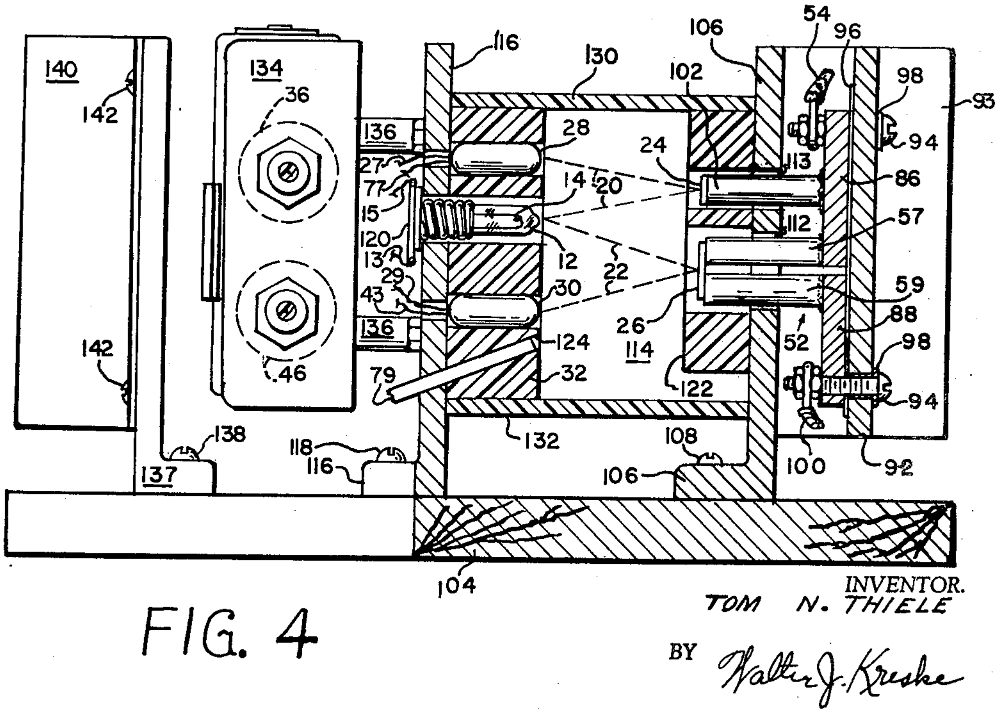
FIG. 4 is a section taken on line 4—4 of FIG. 3 to more clearly show construction.

Referring in more detail to FIGS. 3 and 4 wherein are shown views of a preferred working embodiment of the major components illustrated schematically in FIG. 1 and where for clarity of illustration, the wiring and some of the elements shown in FIG. 1 have been omitted. In the practical embodiment in FIGS. 3 and 4, a mounting block or base member 104 of any suitable material as wood, plastic or metal has fixed thereto, as by screws 108, an angular support member 106. The support member 106 has fastened to it by screws 110 the heat exchanger 92 with the semi-conductor legs 57 and 59 and the rod 102 extending horizontally through openings 112 and 113 in the support member 106 so that the mirrors 26 and 24 are in a chamber 114, one wall of which is formed by the angular support number 106 and an opposite wall of which is formed by another angular support member 116 fixed to the base member 104 by screws 118. The angular support member 116 carries therein a threaded socket 120 for fixing the bulb 12 in position such that light rays 20 and 22 emanating from the filament 14 are reflected from the mirrors 24 and 26 onto the photoresistive elements 28 and 30 respectively which are held in place in recesses in the light barrier and holder member 32 which also serves to prevent light at the filament 14 from directly reaching the photo resistive cells 28 and 30. A similar opaque barrier 122 at the mirrors 24 and 26 helps prevent scatter light from reaching the mirrors 24 and 26. The light barrier 32 also carries an opening 124 directed toward the cold mirror 26 and has therein the tube or nozzle 79 of the blower 78 for providing a steady stream of air or other gas under test onto the cold mirror 26.

The chamber 114 is further enclosed by oppositely disposed side walls 126 and 128 and top and bottom walls 130 and 132, all of any suitable opaque material to provide a complete closure which excludes light and air or gas other than that from the bulb 12 and nozzle 79.

A frame or housing 134 is fixed by spacer rods 136 to the angular support member 116 and is arranged to conveniently carry such of the FIG. 1 embodiment components as batteries 48 and 16 and potentiometers 34 and 36.

A third angular support member 137 is also fastened to the mounting block 104 by screws 138 and has fixed thereto by screws 142 a second heat exchanger 140 which may be similar to the heat exchanger 92 for carrying in heat conductive engagement therewith in conventional manner, the power transistors such as transistor 58 for maintaining it at substantially ambient temperature during operation. The practical working embodiment shown in FIGS. 3 and 4 when combined with the circuitry and the remaining battery supplies shown in FIG. 1 will operate to provide continuous dewpoint temperature tracking as described above.

This invention is not limited to the specific details of construction and operation herein described as equivalents will suggest themeselves to those skilled in the art.

What is claimed is:

1. In combination, a pair of light sensitive members, a light source, a pair of mirrors, each of the mirrors arranged to reflect light from the source onto a respective one of the light sensitive members, a thermoelectric cooler having a Peltier effect type cold junction in cooling relation to one of the mirrors and with a cooling rate dependent on intensity of current flow in a cooling direction through the Peltier effect type junction, and an electric circuit means coupled to the cooler and the light sensitive members for varying said intensity of electric current flow in the cooling direction through said Peltier effect type junction in response to change in reflected light on said light sensitive members.

2. The combination as in claim 1 wherein the light sensitive members are photoresistive cells.

3. The combination as in claim 1 wherein the electric circuit means includes a resistance bridge and the light sensitive members are photoresistive cells in the resistance bridge and arranged to place the bridge in responsive relation to differences in reflected light intensity from the mirrors and in control relation to the electric circuit means.

4. The combination as in claim 1 wherein the thermoelectric cooler is a bismuth telluride PN junction.

5. In a dewpoint determining device of the type having a light source and a pair of mirrors for reflecting light from the source, the combination of electronic amplifier means having a variable unidirectional current output, a Peltier type cooler in cooling relation to one of the mirrors and coupled to receive the unidirectional current output of the amplifier means for effecting said cooling, a pair of photoresistive cells, one of the photoresistive cells in the reflected light path of one of the mirrors and the other of the photoresistive cells in the reflected light path of the other mirror, and a resistance bridge coupled in control relation to the amplifier means and having the photoresistive cells coupled in the bridge in manner to cause a progressively decreasing amplifier output as the reflected light intensity from the cooler mirror decreases with respect to the reflected light intensity from said other mirror.

6. In combination, a heat exchanger, a pair of elongated PN solid state members with each having two ends, one of the ends of each being electrically insulated from and coupled in heat conducting relation to the heat exchanger and the other end of each being electrically coupled to form a PN junction for electric current conduction therethrough, mirror means in heat conducting engagement with the electrically coupled ends, a pair of photoresistive cells, a light source positioned for causing direct reflection of light by the mirror means onto one of the photoresistive cells and scatter light from the mirror means onto the other photoresistive cell, electric current means in responsive relation to the photoresistive cells and in current conducting relation to the pair of solid state members.

7. In combination, a thermoelectric refrigerator of the type having a junction which is cooled by the passage of electric current in a cooling direction therethrough, a polished surface in heat conducting relation to the junction, current control means arranged for changing intensity of current passing through the refrigerator junction in said cooling direction in response to changes in reflectivity of the polished surface, and a transistor amplifier in responsive relation to the control means and in current conducting relation to the junction for supplying said cooling current through the junction.

8. In combination, a light sensitive member, a light source, a mirror, the mirror arranged to reflect light from the source onto the light sensitive member, a thermoelectric cooler having o Peltier effect type cold junction in cooling relation to the mirror and with a cooling rate dependent on intensity of current flow in a cooling direction through the Peltier effect type junction, and electric circuit means coupled to the cooler and light sensitive member for varying said intensity of cooling direction electric current flow through said Peltier effect type junction in relation to variation in reflected light on said light sensitive member.

9. In combination, a thermoelectric cooler having a Peltier effect type cold junction with a cooling rate which varies with the rate of electric current flow in a cooling direction through the Peltier effect type cold junction, a highly reflective surface in heat conductive relation to the cold junction for receiving dewpoint condensate deposit, electric circuit means for supplying operating current flow in the cooling direction through the Peltier effect type cold junction of the thermoelectric cooler, and light sensitive means in responsive relation to said surface and in control relation to the circuit for limiting the intensity of said current flow in the cooling direction through said Peltier effect type junction in response to depth of said condensate deposit on the highly reflective surface.

10. In combination, a thermoelectric cooler having a Peltier effect type cold junction with a cooling rate which varies with the intensity of flow of operating current in a cooling direction through said Peltier effect type junction, condensate sensitive means in heat conductive relation to the Peltier effect type cold junction, electric circuit means for supplying operating current in the cooling direction through the Peltier effect type cold junction of the thermoelectric cooler, and means in responsive relation to the condensate sensitive means and in control relation to the circuit means for varying the intensity of flow of said operating current in the cooling direction through the Peltier effect type junction in inverse relation to variation in amount of condensate at said condensate sensitive means.

11. In a device for determining the dewpoint of a gas, the combination of a thermoelectric cooler having a hot and a cold junction whose rates of cooling and heating respectively vary with the intensity of flow of operating current in a single direction through said junctions, heat exchanger means coupled to the hot junction for maintaining said hot junction at substantially the temperature of said gas, electric circuit means coupled to the thermoelectric cooler for supplying said single direction operating current through said junctions, and condensate responsive means in heat conductive engagement with the cold junction and in control relation to said circuit means for varying the intensity of said operating current in inverse relation to amount of said condensate on said cold junction.

12. The method of tracking the dewpoint of a gas comprising the steps of passing an electric current through a thermoelectric cooler in a direction to cause a Peltier effect type cooling of a surface for receiving a dew layer, passing the gas whose dewpoint is to be tracked over the surface being cooled to cause condensate deposit on said surface for creating said dew layer, varying the intensity of said electric current in said cooling direction through said thermoelectric cooler in inverse relation to the thickness of said dew layer to establish an equilibrium condition characterized by the maintenance of a substantially constant dewlayer of condensate from said gas on said cooled surface, and measuring the temperature of said surface during said equilibrium condition.

13. In combination, a heat exchanger having a metallic heat conducting base, a thin dielectric membrane on said base, a pair of copper heat sink blocks on the membrane, a P type elongated solid state member and an N type elongated solid state member, each of the solid state members having two ends, one of the ends of the P type member fixed in heat and electrically conductive relation to one of the copper blocks, one of the ends of the N type member fixed in heat and electrically conductive relation to the other copper block, a current conductive electrical junction coupling the other ends of the P and N type members, a mirror fixed in heat conducting relation to the junction, current means electrically coupled across the blocks for passing current through the junction and P and N members in a direction causing thermoelectric cooling at the junction, and means in responsive relation to the mirror for determining the temperature at which the reflective capacity of the mirror changes.

14. In combination, a housing having opposed walls inclosing a chamber, an electric light bulb fixed substantially centrally of one of said opposed walls in the chamber, two photoresistive cells, one cell fixed at one side of the light bulb and the other cell fixed at the other side of the light bulb at the one wall in the chamber, a barrier in position for obstructing passage of light rays in a direct line from the bulb to the cells, an elongated thermoelectric refrigerator having cold and hot junctions with the cold junction extending through the opposite wall to a position in the chamber distal from the light bulb and one of the cells, a mirror in heat conducting engagement with the cold junction and positioned to reflect light rays from the light bulb onto said one cell, a heat exchanger outside the chamber and in heat conducting engagement with the hot junction, a second mirror in the chamber positioned to reflect light rays from the light bulb onto the other photoresistive cell, a heat conductive member in heat conducting engagement with the second mirror and heat exchanger, electric current means coupled to the cells and the thermoelectric refrigerator, and means for blowing a stream of gas under test onto the first mentioned mirror.

15. In combination, a thermoelectric refrigerator of the type having a junction with a reflective surface which is cooled by the passage of electric current in a cooling direction through said refrigerator, direct current means for supplying said current through said refrigerator, and current control means in responsive relation to said reflective surface and in control relation to said current means for changing the intensity of said cooling direction current passing through said refrigerator in response to changes in reflectivity of the reflective surface.

16. The method of detecting the dewpoint of a gas comprising the steps of passing the gas over a reflective surface, Peltier effect cooling of the reflective surface in proportional relation to rate of an electric cooling direction current causing said Peltier effect cooling, decreasing rate of the electric cooling current and thereby said rate of cooling of the reflective surface in proportional relation to decrease in reflectivity of the reflective surface from dew formation on the cooled reflective surface until an equilibrium condition is reached.

References Cited by the Examiner

UNITED STATES PATENTS

| | | | |
|---|---|---|---|
| 2,624,195 | 1/53 | Van Alen | 73—17 |
| 2,671,334 | 3/54 | Gunn | 73—17 |
| 2,979,950 | 4/61 | Leone | 73—17 X |

RICHARD C. QUEISSER, *Primary Examiner.*

Disclaimer 3,195,345.—*Tom N. Thiele*, Oconomowoc, Wis. THERMOELECTRIC DEW-POINT DETERMINING SYSTEM. Patent dated July 20, 1965. Disclaimer filed Feb. 11, 1976, by assignee, *EG & G, Inc.*

Hereby enters this disclaimer to claims 1, 2, 3, 4, 6, 7, 8, 9, 10, 11, 12, 13, 15 and 16 of said patent.

[*Official Gazette May 25, 1976.*]